(12) United States Patent
Sidles

(10) Patent No.: US 6,357,369 B1
(45) Date of Patent: Mar. 19, 2002

(54) ROTATING SEED DRILL

(76) Inventor: James Sidles, 3048 Southern Rd., Richfield, OH (US) 44286

( * ) Notice: Subject to any disclaimer, the term of this patent is extended or adjusted under 35 U.S.C. 154(b) by 0 days.

(21) Appl. No.: 09/638,619

(22) Filed: Aug. 15, 2000

(51) Int. Cl.⁷ ................................................ A01C 7/00
(52) U.S. Cl. ...................... 111/177; 221/211
(58) Field of Search ............... 111/14, 18, 19, 111/50, 77, 72, 73, 78, 92, 99, 177; 221/211, 185, 237, 254

(56) References Cited

U.S. PATENT DOCUMENTS

| 763,308 A | | 6/1904 | Mitchell |
|---|---|---|---|
| 1,896,562 A | | 2/1933 | Scarlett |
| 2,569,421 A | * | 9/1951 | Larson ........................ 111/177 |
| 2,615,408 A | * | 10/1952 | Hylten-Cavallius ............ 111/78 |
| 3,107,822 A | * | 10/1963 | Regenstein, Jr. ........ 221/211 X |
| 3,648,631 A | | 3/1972 | Fiedler |
| 3,773,224 A | | 11/1973 | Winslow |
| 5,025,951 A | | 6/1991 | Hook |
| 5,465,869 A | * | 11/1995 | Schleicher et al. ......... 221/185 |

FOREIGN PATENT DOCUMENTS

| CZ | 72972 | 4/1944 |
|---|---|---|
| GB | 929603 | 6/1963 |
| JP | 4-148604 | 5/1992 |
| SU | 147055 | 1/1960 |

* cited by examiner

Primary Examiner—Robert E. Pezzuto
(74) Attorney, Agent, or Firm—Hahn Loeser & Parks LLP

(57) ABSTRACT

A device (101) deposits a plurality of seeds in a sequential manner below a soil surface (101). The device is propelled along the soil surface. The device also has a container (130) for the plurality of seeds, the container having at least one outlet port (132): at least one dispenser for dispensing seeds in sequential manner from the container; at least one implanter (10), each implanter having a hollow seed tube (12) with open first and second ends (14, 16) and a tube body (18) between the open ends, the tube body defining a longitudinal axis, the open first end adapted for receiving seeds in sequential manner from, the dispenser, the tube body adapted to be rotated about its longitudinal axis and a device for rotating (20) each tube body about the longitudinal axis thereof; and a mounting device (134) for each of the implanters on the device such that the longitudinal axis of each hollow seed tube is at an acute angle to the soil surface as the implanter is moved forwardly across the soil surface and the open second end of each hollow seed tube is below the soil surface at a predetermined depth.

3 Claims, 1 Drawing Sheet

ROTATING SEED DRILL

The present invention relates to a device for sowing seed, particularly a seed drill. More particularly, the device relates to a hollow rotating sowing tube, which receives a seed from a seed box at one end of the tube and deposits the seed in the ground at the opposite end of the tube.

BACKGROUND OF THE INVENTION

In the field of agriculture, it is a common need to plant seeds, particularly round seeds such as soy beans, below a soil surface. A seed planting device for such a seed must therefore penetrate the soil surface to prepare a furrow, deposit the seed in a reproducible fashion along the row-like furrow so that the seeds are properly spaced from each other, and then close the furrow in which the seed has been deposited, so that the seed is not exposed to the elements and to animals who would eat the seed, thereby preventing proper germination and growth.

In some prior art, the device used to achieve this goal comprises a disk or similar device to cut or open the furrow, a hollow, non-rotating seed tube to deposit the seed and a separate device to close the furrow. For example, USSR Pat. 147055 to Volkov shows a device for dispersing seed from a seed supply into a pre-formed furrow. The seed-dispersing device rotates, but it does not use this rotation in any manner to either open or close the furrow. U.S. Pat. No. 5,025,951 to Hook teaches an electronic seed rate system for a "grain drill," but it does not appear to teach a device where a rotating seed tube is used as the furrow-forming tools. U.S. Pat. No. 763,308 to Mitchell shows a rotary seed disk for distributing seed into a tubular dropping spout, which lies next to a furrow-opening blade. The spout does not rotate and does not assist in cutting the furrow. British Patent Specification 929,063 to Jordan teaches a sowing machine in which a rotating member distributes seed from a seed supply bin into a seed outlet channel, but the seed outlet channel is not shown as being rotated to assist is cutting the furrow. Japanese Patent Application 4-128604 to Sawada teaches a sort of "pea shooter" for blowing rice seed into paddy rice, but the sowing pipe does not rotate and does not even contact the soil.

A different device illustrative of the prior art is shown in U.S. Pat. No. 3,648,6331 to Fiedler. This patent teaches a method of planting seed that is in a gel media. A "knife-like" soil opener cuts open the soil to a pre-determined depth and a bead of the seed-containing gel is pumped through a dispenser nozzle located behind the soil opener into the furrow.

Another technique of the prior art is shown in U.S. Pat. No. 3,773,224 to Winslow, where a seed dispensing wheel has individual radial tubes through which the seed passes, but the tubes are not rotated about their longitudinal axes.

It is therefore a desired goal to provide a device in which a tube, rotated about its longitudinal axis, provides both a soil opening for deposit of a sequence of seeds below the soil surface as well as a conduit for transmission of the sequence of seeds from a seed source to the soil opening.

SUMMARY OF THE INVENTION

This and other advantages of the present invention are provided by a device for depositing a plurality of seeds in a sequential manner below a soil surface. Such a device comprises a means for propelling the seed depositing device in a forward direction along the soil surface; a device, having at least one outlet port, for containing the plurality of seeds; at least one device for dispensing seeds in sequential manner from the seed containing device, one of the seed dispensing devices being provided for each outlet port of the seed containing device; at least one seed implanting device; and a means for mounting each of the at least one seed implanting devices to the seed depositing device.

Each of the seed implanting devices will comprise a hollow seed tube, with the hollow seed tube being adapted to be rotated about a longitudinal axis by a means for rotating. The hollow seed tube will have open first and second ends and a tube body between the open ends, defining the longitudinal axis. The open first end will be adapted for receiving seeds in sequential manner from the seed dispensing device, to which the open first end is communicated. In use, the longitudinal axis of each hollow seed tube is set at an acute angle to the soil surface as the seed implanting device is moved forwardly across the soil surface and the open second end of each hollow seed tube is below the soil surface at a predetermined depth.

In some aspects of the invention, the means for rotating each tube body about its longitudinal axis is adapted to allow the speed of rotation to be selectively varied.

Similarly, in some aspects of the invention, the means for mounting each seed implanting device is adapted to allow the angularity of the tube bodies with respect to the soil surface to be selectively varied.

BRIEF DESCRIPTION OF THE DRAWINGS

A better understanding of the present invention will be had when reference is made to the accompanying drawings, wherein identical parts are identified by identical reference numerals and wherein.

DETAILED DESCRIPTION OF THE PRESENT INVENTION

The present invention device is best described by first describing the novel aspects thereof before describing the better known aspects. For this reason, FIG. 1 shows a schematic of a seed implanting device 10 incorporating the present invention.

Figure 1:
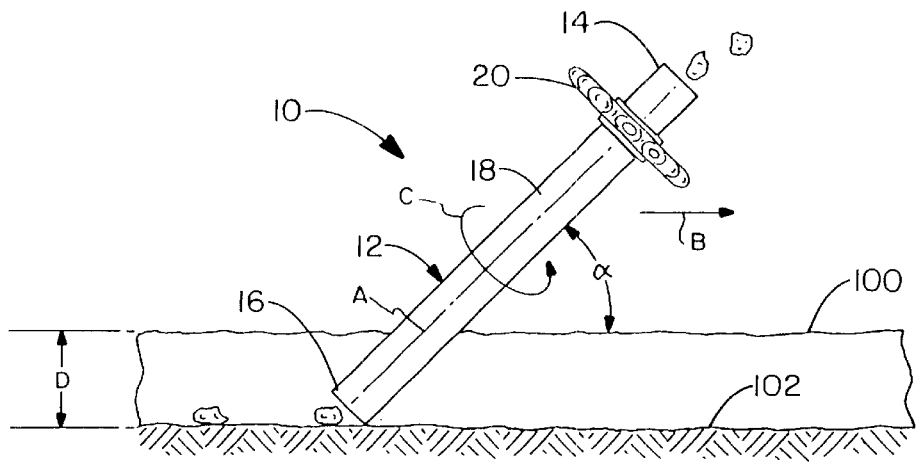
FIG. 1 shows a schematic depiction of the seed implanting device of the present invention, isolated from the overall seed depositing device.

In presenting FIG. 1, it is immediately noted that a single seed implanting device 10 is depicted, while most practical commercial embodiments will provide a plurality of such devices 10, operating in parallel. However, the important features of the present invention are best illustrated in this type of isolation, since the only advantage of using more than one such device is a non-synergistic effect of scale. The first element of the device is a hollow seed tube 12. The tube 12 will usually be manufactured from a metallic material and have a characteristic thickness to provide sufficient rigidity to withstand the forces to which it will be subjected. The tube 12 has first and second ends 14, 16, with a tube body 18 between the two ends. In most embodiments of the invention, the tube body 18 will be a right cylinder, so that the body effectively defines a longitudinal axis A. The internal diameter, that is, the outside diameter of the tube less the tube wall thickness, will be large enough to allow the seed (not shown) to freely move through the tube. To accomplish that, the internal diameter of tube body 18 will generally be in the range of from about two to about four times the average effective diameter of the seed. Of course, this makes the presumption that the seed will be round, although it is not presumed that any seed will be perfectly spherical. The open top or first end 14 of the tube 12 is adapted to receive the seeds to be planted. These seeds, which will be contained in a seed storage device (not shown in FIG. 1) enter the top end 14 of the tube 12 from a seed dispensing device (not shown) at a rate appropriate for the speed of the seeding device. The seed dispensing device will be located at an outlet port of the seed storage device. In most embodiments of the present invention, the seed dispensing device will utilize known metering techniques for selectively dispensing the seeds into the tube 12, and it would be expected that the seed dispensing device would be adapted to allow the rate of seed dispensation into the tube to be varied, based on a variety of factors, including for purpose of illustration, forward rate of travel of the seeding device, seed size and intended seed planting density. The tube body 18 is mounted using a mounting means (also not shown in this figure) so that the longitudinal axis A of the tube body is situated at an acute angle α relative to the ground, the surface of which is shown as 100. Typically, the tube body 18 will be received through the mounting means in a bearing so that the tube body may be freely rotated about its longitudinal axis A. When the tube body 18 is positioned like this, the top or first end 14 will point forwardly, that is, in the direction of travel of an impelling device used to advance the seed implanting device 10, with the second end 16 pointing in a rearward direction, or opposite to the direction of travel. This direction of travel is shown in FIG. 1 by an arrow identified with reference numeral B. The mounting means will be situated so that at least a portion of the tube body 18 and the second end 16 thereof are below the soil surface or ground level 100. For this reason, the forward motion of the seed implanting device 10 in the soil acts to cuts a narrow furrow in the soil, the bottom 102 of the furrow being a predetermined depth D below the surface 100. The ability to vary the angle a and the depth D will typically be provided by the mounting means.

A further feature of the present invention is the rotation of the tube body 18 about its longitudinal axis A, that is, in a direction shown in FIG. 1 by arrow C. The rotation may be either clockwise or counterclockwise. This feature may be accomplished by a variety of means, although many embodiments of the invention will use a sprocket 20 or similar series of tooth-like projections about a circumference of a tube body 18. The sprocket will engage a drive chain (not shown) or similar means driven by an drive means. Typically, the drive means will be associated with the mounting means. When the tube body 18 is rotated about its longitudinal axis A, several desired effects are achieved. First, the rotation assists in cutting the soil surface to prepare the narrow furrow into which the seeds are to be deposited. Second, the rotation assists in closing the furrow as the tube body 18 passes through the soil, since the rearward motion on one side of the tube forces loose soil rearwardly. Third, the rotation of the tube body 18 assists the passage of the seeds through the tube body. It will be clear to those of skill in this art that the effectiveness of the device is directly related to the rotational speed of the tube body 18, at least up to a point. Certainly, a tube body 18 which does not rotate is nothing more than a seed tube. The beneficial effects of rotation, however, are felt both outside the tube body 18, and inside the tube body. It is likely that the diminishing returns of increasing tube body rotation speed beyond a given speed will first be experienced inside the tube bidy rather than outside the tube body.

In many prior art seed tubes, the tube is positioned in an effectively vertical orientation, so that a seed falls through the center of the tube with minimal interaction with the internal tube walls. The angularity of the present invention tube body 18 precludes this. Without tube body rotation, the individual seeds being dispensed into the tube body would slide or roll by gravity along the lowermost surface of the internal tube body wall, which greatly enhances the potential for the seeds being caught up in the tube body. In such a situation, it would be very desirable to vibrate or agitate the tube body 18 to minimize this possible "bridging." When the tube body 18 is rotated, the rotation causes the seeds to tumble down through the angled tube, so that bridging is effectively eliminated. In one aspect of the invention, the internal surface of the tube body 18 would be smooth and not provided with any rifling or similar scoring. If there is any placement of any spiral grooves inside the tube body 18, it will of course be critical to the design to determine the direction of the grooves relative to the direction of rotation of the tube body while it is in operation.

Similarly, in one aspect of the invention as depicted in the accompanying drawings, the exterior surfaces of the tube body 18 will be smooth and not provided with any rifling or similar scoring.

The first end 14 of the tube body 18 will be cut around the circumference of the tube, that is, on a plane normal to the longitudinal axis. In some aspects of the invention, the second end 16 of the tube body 18 may be cut obliquely, although it is not expected that this would provide any particular advantage. While it has been noted above that, in most aspects of the invention, the tube body 18 will be a right cylinder, it may be advantageous to taper the tube body, particularly at or near the second end 16, if this assists the movement of the tube body through the soil. If this is done, however, caution must be exercised to prevent holdup or bridging of seed on the internal surface of the tube body 18.

Figure 2:
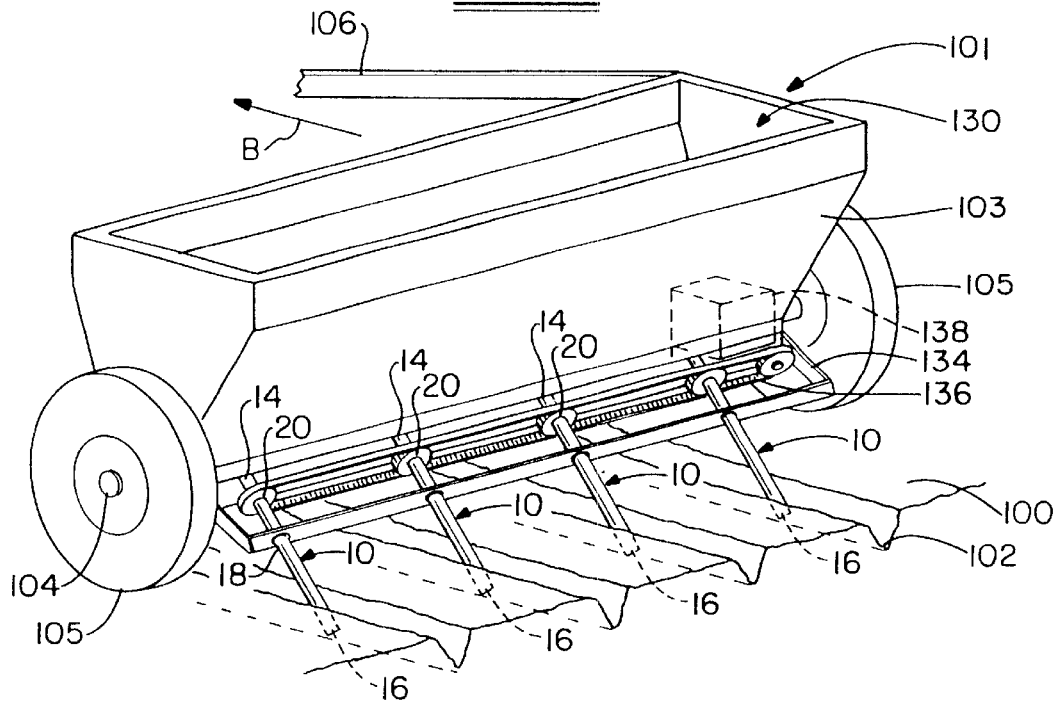
FIG. 2 shows a depiction of an embodiment of a seed depositing device incorporating the seed implanting device of the present invention.

Attention is now directed to FIG. 2, where a possible commercial embodiment of the present invention is provided. This seed depositing device 101 has a number of possible variations which will be know to those of skill in this art. In this embodiment the seed depositing device 101 will be built up upon a well known dray or wagon 103 of a type having a single non-driven axle 104 with a set of wheels 105 attached to the ends thereof and a hitch 106 for attaching the wagon to a tractor or other means for pulling the wagon.

The device 101 shows a plurality of the seed implanting devices 10 as described in association with FIG. 1. The seeds to be planted will be placed in a seed storage device 130 which is provided with at least one outlet port. Associated with each outlet port 132 will be a seed dispensing device to permit the selective delivery of seed through the outlet port into a seed implanting device 10 associated with the outlet port. No particular detail of the seed dispensing device is provided, as this will be well known to those of skill in this art. The tube body 18 of each of the seed implanting devices 10 will be associated with a mounting means 134, shown generally in FIG. 2 as an adjustable frame, so that the angularity and depth of each tube body 18 may be adjusted. Again, the exact detail of such adjustment is not a particular feature of the invention and will be known to those of ordinary skill. The mounting means should be able to readily alter the angularity of the tube bodies between a range from about 30 to about 60 degrees from the horizontal, and providing the capability of adjusting the angularity within an even wider range would not be uncommon, although it is unlikely that the angularity would be in the range of between about 0 to about 15 degrees from the horizontal or between about 75 to about 90 degrees from the horizontal. In a similar fashion, the depth of the furrow to be cut by the device 100 as it is propelled forward should be able to be readily varied, and such techniques are clearly known in the art.

Rotation of each tube body 18 about its longitudinal axis A may be accomplished by sprockets 20 on the tube bodies, through engagement of a drive chain 136 or similar means driven by an drive means, such as motor 138.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A device for depositing a plurality of seeds in a sequential manner below a soil surface, comprising:

means for propelling the seed depositing device in a forward direction along the soil surface;

a device for containing the plurality of seeds, the seed containing device having at least one outlet port;

at least one device for dispensing seeds in sequential manner from the seed containing device, one said seed dispensing device being provided for each outlet port of the seed containing device;

at least one seed implanting device, each said seed implanting device comprising a hollow seed tube with open first and second ends and a tube body between the open ends, the tube body defining a longitudinal axis, the open first end adapted for receiving seeds in sequential manner from the seed dispensing device, to which the open first end is communicated, the tube body adapted to be rotated about the longitudinal axis thereof; and a means for rotating each said tube body about the longitudinal axis thereof; and means for mounting each of the at least one seed implanting devices to the seed depositing device such that the longitudinal axis of each hollow seed tube is at an acute angle to the soil surface as the seed implanting device is moved forwardly across the soil surface and the open second end of each hollow seed tube is below the soil surface at a predetermined depth.

2. The device of claim 1 wherein the means for rotating each said tube body about the longitudinal axis thereof is adapted to allow the speed of rotation to be selectively varied.

3. The device of claim 1 wherein the means for mounting each said seed implanting device is adapted to allow the angularity of the tube bodies with respect to the soil surface to be selectively varied.

* * * * *